(12) United States Patent
Gonia et al.

(10) Patent No.: US 10,267,893 B2
(45) Date of Patent: Apr. 23, 2019

(54) SYSTEMS AND METHODS OF ACCURACY MAPPING IN A LOCATION TRACKING SYSTEM

(71) Applicant: Honeywell International Inc., Morris Plains, NJ (US)

(72) Inventors: Patrick Gonia, Maplewood, MN (US); Soumitri Kolavennu, Blaine, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/439,437

(22) Filed: Feb. 22, 2017

(65) Prior Publication Data

US 2017/0160377 A1 Jun. 8, 2017

Related U.S. Application Data

(63) Continuation of application No. 13/331,564, filed on Dec. 20, 2011, now abandoned.

(51) Int. Cl.
*G01S 5/02* (2010.01)
*H04W 64/00* (2009.01)
*G01S 5/14* (2006.01)

(52) U.S. Cl.
CPC ........... *G01S 5/0252* (2013.01); *G01S 5/021* (2013.01); *G01S 5/0263* (2013.01); *G01S 5/14* (2013.01); *G01S 5/145* (2013.01); *H04W 64/00* (2013.01)

(58) Field of Classification Search
CPC ...... G01S 5/0252; G01S 5/0263; G01S 5/145; G01S 5/30; G01S 5/16; G01S 5/0215; G01S 5/14; G01S 5/0018; G01S 5/0045; G01S 5/0009; G01S 5/009; G01S 5/02; G01S 19/00; G01S 5/021; G01S 5/12; H04W 56/0095; H04W 64/00; H04W 52/0245; H04W 52/245
See application file for complete search history.

(56) References Cited

U.S. PATENT DOCUMENTS

| 4,330,866 | A | | 5/1982 | Malchow |
| 4,696,027 | A | | 9/1987 | Bonta |
| 4,831,328 | A | * | 5/1989 | Brust ...................... G01R 13/22 250/311 |

(Continued)

OTHER PUBLICATIONS

Shi, Hongchi, et al. "Cramer-Rao Bound Analysis of Quantized RSSI Based Localization in Wireless Sensor Networks." Proceedings of the 2005 11th International Conference on Parallel and Distributed Sytems (ICPADS'05), 2005, 5 pages.

(Continued)

*Primary Examiner* — Devona E Faulk
*Assistant Examiner* — Charles L Beard
(74) *Attorney, Agent, or Firm* — Wick Phillips Gould & Martin, LLP

(57) ABSTRACT

Systems and method of accuracy mapping in a location tracking system are provided. Methods include identifying a position of at least one location anchor on a site rendering, determining, for a plurality of positions on the site rendering, an estimated error value of location accuracy as a function of position on the site rendering, generating an overlay rendering of the estimated error values of location accuracy for the plurality of position on the site rendering, and the site rendering with the overlay rendering therewith.

25 Claims, 11 Drawing Sheets

(56) References Cited

U.S. PATENT DOCUMENTS

| | | | |
|---|---|---|---|
| 5,390,339 A * | 2/1995 | Bruckert | G01S 5/02 |
| | | | 342/457 |
| 5,640,677 A * | 6/1997 | Karlsson | H04W 36/04 |
| | | | 455/434 |
| 5,724,660 A | 3/1998 | Kauser et al. | |
| 5,732,328 A * | 3/1998 | Mitra | H04B 7/2628 |
| | | | 455/522 |
| 5,877,035 A * | 3/1999 | Fujino | G01N 21/94 |
| | | | 257/E21.525 |
| 5,966,661 A * | 10/1999 | Bernardin | H04W 16/18 |
| | | | 455/422.1 |
| 5,983,106 A * | 11/1999 | Bernardin | H04W 16/18 |
| | | | 455/446 |
| 5,995,836 A * | 11/1999 | Wijk | H04W 36/30 |
| | | | 455/436 |
| 6,006,095 A * | 12/1999 | Bernardin | H04W 24/00 |
| | | | 455/446 |
| 6,097,953 A * | 8/2000 | Bonta | H04W 36/30 |
| | | | 455/436 |
| 6,173,186 B1 * | 1/2001 | Dalley | H04W 16/18 |
| | | | 455/446 |
| 6,188,894 B1 * | 2/2001 | Clancy | H04W 16/18 |
| | | | 455/423 |
| 6,285,883 B1 * | 9/2001 | Bringby | H04W 36/30 |
| | | | 370/331 |
| 6,445,916 B1 | 9/2002 | Rahman | |
| 6,526,283 B1 | 2/2003 | Jang | |
| 6,642,884 B2 | 11/2003 | Bryant et al. | |
| 6,674,403 B2 | 1/2004 | Gray et al. | |
| 6,708,036 B2 * | 3/2004 | Proctor | H04W 16/06 |
| | | | 455/424 |
| 6,762,712 B2 * | 7/2004 | Kim | G01C 21/206 |
| | | | 342/135 |
| 6,799,047 B1 * | 9/2004 | Bahl | G01C 21/206 |
| | | | 455/456.1 |
| 6,839,560 B1 * | 1/2005 | Bahl | G01C 21/206 |
| | | | 342/450 |
| 6,990,428 B1 | 1/2006 | Kaiser et al. | |
| 7,031,405 B1 | 4/2006 | Touzni et al. | |
| 7,209,743 B2 * | 4/2007 | Babovic | H04B 17/21 |
| | | | 455/436 |
| 7,286,835 B1 * | 10/2007 | Dietrich | H04W 64/00 |
| | | | 455/456.1 |
| 7,359,718 B2 | 4/2008 | Tao et al. | |
| 7,389,111 B2 | 6/2008 | Petrus | |
| 7,444,149 B2 * | 10/2008 | Prehofer | H04W 36/24 |
| | | | 455/436 |
| 7,498,986 B2 * | 3/2009 | Thomas | G01S 5/04 |
| | | | 342/465 |
| 7,570,593 B1 | 8/2009 | ElBatt et al. | |
| 7,586,891 B1 | 9/2009 | Masciulli | |
| 7,643,936 B1 * | 1/2010 | Boxberger | H04W 24/08 |
| | | | 340/995.19 |
| 7,746,343 B1 | 6/2010 | Charaniya et al. | |
| 7,830,250 B2 * | 11/2010 | Huseth | G01S 11/06 |
| | | | 340/500 |
| 7,835,749 B1 * | 11/2010 | Hart | H04W 36/385 |
| | | | 342/450 |
| 7,848,762 B2 | 12/2010 | Gordon et al. | |
| 7,899,467 B2 | 3/2011 | Feuerstein et al. | |
| 7,966,021 B2 | 6/2011 | Dietrich et al. | |
| 8,032,153 B2 | 10/2011 | Dupray et al. | |
| 8,200,242 B2 | 6/2012 | Dietrich et al. | |
| 8,229,442 B1 * | 7/2012 | Ji | H04W 24/00 |
| | | | 455/446 |
| 8,295,846 B2 * | 10/2012 | Hwang | G01S 5/06 |
| | | | 455/446 |
| 8,325,704 B1 | 12/2012 | Lemkin et al. | |
| 8,509,809 B2 | 8/2013 | Hirsch | |
| 8,532,676 B1 * | 9/2013 | El-Sallabi | H04W 64/00 |
| | | | 455/456.5 |
| 8,750,267 B2 | 6/2014 | Aggarwal et al. | |
| 8,768,344 B2 | 7/2014 | Naguib et al. | |
| 8,879,607 B2 * | 11/2014 | Skarp | H04W 4/023 |
| | | | 342/350 |
| 8,948,742 B2 * | 2/2015 | Horton | H04W 16/18 |
| | | | 455/115.1 |
| 9,080,889 B2 * | 7/2015 | Shrum, Jr. | H04W 48/18 |
| 9,451,404 B2 * | 9/2016 | Al-Najjar | H04W 4/023 |
| 9,467,965 B2 * | 10/2016 | Liu | H04W 64/00 |
| 9,632,668 B2 * | 4/2017 | Xie | H04W 16/22 |
| 9,654,904 B2 * | 5/2017 | Tredoux | H04L 43/16 |
| RE46,501 E * | 8/2017 | Bahl | |
| 9,921,314 B2 * | 3/2018 | Jakel | G01S 19/07 |
| 10,021,737 B2 * | 7/2018 | Edge | G01S 5/0236 |
| 10,025,993 B2 * | 7/2018 | Seeber | G06T 7/223 |
| 2002/0082012 A1 * | 6/2002 | Wang | H04W 36/32 |
| | | | 455/436 |
| 2002/0107037 A1 * | 8/2002 | Wille | H04W 16/04 |
| | | | 455/464 |
| 2003/0083819 A1 * | 5/2003 | Rooney | G01V 11/00 |
| | | | 702/5 |
| 2003/0128674 A1 | 7/2003 | Kong et al. | |
| 2003/0222820 A1 | 12/2003 | Karr et al. | |
| 2004/0022214 A1 * | 2/2004 | Goren | G01S 5/0252 |
| | | | 370/332 |
| 2004/0059547 A1 | 3/2004 | Aftelak | |
| 2004/0166877 A1 * | 8/2004 | Spain, Jr. | G01S 5/0252 |
| | | | 455/456.1 |
| 2004/0190718 A1 * | 9/2004 | Dacosta | H04L 63/0492 |
| | | | 380/247 |
| 2004/0195500 A1 | 10/2004 | Sachs et al. | |
| 2004/0198373 A1 | 10/2004 | Ford et al. | |
| 2004/0198392 A1 | 10/2004 | Harvey et al. | |
| 2004/0203904 A1 * | 10/2004 | Gwon | G01S 5/0252 |
| | | | 455/456.1 |
| 2004/0236547 A1 | 11/2004 | Rappaport et al. | |
| 2004/0248589 A1 * | 12/2004 | Gwon | G01S 5/0252 |
| | | | 455/456.1 |
| 2005/0075199 A1 | 4/2005 | Sheha et al. | |
| 2005/0124354 A1 * | 6/2005 | Durgin | H04W 64/00 |
| | | | 455/456.1 |
| 2005/0128139 A1 * | 6/2005 | Misikangas | G01S 3/06 |
| | | | 342/350 |
| 2005/0131635 A1 | 6/2005 | Myllymaki et al. | |
| 2005/0136845 A1 | 6/2005 | Masuoka et al. | |
| 2005/0136944 A1 | 6/2005 | Misikangas et al. | |
| 2005/0185615 A1 | 8/2005 | Zegelin | |
| 2005/0208952 A1 * | 9/2005 | Dietrich | G01S 5/0221 |
| | | | 455/456.1 |
| 2005/0246334 A1 * | 11/2005 | Tao | G01S 5/0252 |
| 2005/0266855 A1 * | 12/2005 | Zeng | G01S 5/0252 |
| | | | 455/456.1 |
| 2005/0282540 A1 | 12/2005 | Motamedi et al. | |
| 2005/0285792 A1 | 12/2005 | Sugar et al. | |
| 2005/0285793 A1 | 12/2005 | Sugar et al. | |
| 2006/0071853 A1 | 4/2006 | Sayers | |
| 2006/0205417 A1 * | 9/2006 | Ju | G01S 5/02 |
| | | | 455/456.5 |
| 2006/0211376 A1 * | 9/2006 | Bhattacharya | G01S 5/0252 |
| | | | 455/67.11 |
| 2007/0011503 A1 * | 1/2007 | Kitani | H04B 1/406 |
| | | | 714/704 |
| 2007/0077941 A1 * | 4/2007 | Gonia | G01S 1/66 |
| | | | 455/456.1 |
| 2007/0099678 A1 * | 5/2007 | Kim | H04W 52/028 |
| | | | 455/574 |
| 2007/0132577 A1 * | 6/2007 | Kolavennu | G01S 5/021 |
| | | | 340/539.13 |
| 2007/0155334 A1 | 7/2007 | Chang et al. | |
| 2007/0230407 A1 | 10/2007 | Petrie et al. | |
| 2007/0232319 A1 * | 10/2007 | Bells | H04W 64/00 |
| | | | 455/456.1 |
| 2007/0241965 A1 * | 10/2007 | Kolavennu | G01S 7/003 |
| | | | 342/465 |
| 2007/0262985 A1 | 11/2007 | Watanbe et al. | |
| 2008/0051036 A1 | 2/2008 | Vaswani et al. | |
| 2008/0112699 A1 * | 5/2008 | Huseth | G01S 5/02 |
| | | | 396/89 |
| 2008/0166973 A1 | 7/2008 | Hart et al. | |

(56) References Cited

U.S. PATENT DOCUMENTS

| | | | |
|---|---|---|---|
| 2008/0180246 A1* | 7/2008 | Malik | G06K 7/0008 340/572.1 |
| 2008/0192724 A1* | 8/2008 | Kondo | H04L 47/10 370/345 |
| 2008/0209521 A1* | 8/2008 | Malaney | H04L 63/0492 726/4 |
| 2008/0225799 A1 | 9/2008 | Lee et al. | |
| 2008/0307025 A1* | 12/2008 | Licul | G01S 5/0215 708/308 |
| 2009/0005063 A1 | 1/2009 | Malik et al. | |
| 2009/0034793 A1* | 2/2009 | Dong | G06K 9/00369 382/103 |
| 2009/0043495 A1 | 2/2009 | Hattori et al. | |
| 2009/0081956 A1 | 3/2009 | Liechty et al. | |
| 2009/0138151 A1* | 5/2009 | Smid | G05D 1/0212 701/27 |
| 2009/0209268 A1* | 8/2009 | Ha | G01S 5/0289 455/456.1 |
| 2009/0221297 A1* | 9/2009 | Wengerter | H04W 52/243 455/453 |
| 2009/0232121 A1 | 9/2009 | Mark et al. | |
| 2010/0017791 A1* | 1/2010 | Finkler | G06F 11/3409 717/158 |
| 2010/0045388 A1 | 2/2010 | Xu | |
| 2010/0067388 A1 | 3/2010 | Kim et al. | |
| 2010/0135178 A1* | 6/2010 | Aggarwal | G01S 5/0205 370/252 |
| 2010/0238862 A1* | 9/2010 | Davidson | H04W 4/029 370/328 |
| 2010/0249549 A1 | 9/2010 | Baker, Jr. et al. | |
| 2010/0267397 A1* | 10/2010 | Shen | H04W 64/006 455/456.1 |
| 2010/0285815 A1* | 11/2010 | Treu | G01S 5/0263 455/456.1 |
| 2011/0021156 A1* | 1/2011 | Kobayashi | H04W 24/00 455/67.13 |
| 2011/0037571 A1 | 2/2011 | Johnson, Jr. et al. | |
| 2011/0077862 A1 | 3/2011 | Huang et al. | |
| 2011/0090121 A1* | 4/2011 | Thomson | G01S 5/02 342/450 |
| 2011/0110242 A1* | 5/2011 | Nixon | H04W 64/00 370/252 |
| 2011/0156957 A1 | 6/2011 | Waite et al. | |
| 2011/0161044 A1 | 6/2011 | Gonia et al. | |
| 2011/0161885 A1 | 6/2011 | Gonia et al. | |
| 2011/0170576 A1 | 7/2011 | Nagano et al. | |
| 2011/0176523 A1* | 7/2011 | Huang | G01S 5/02 370/338 |
| 2011/0221634 A1* | 9/2011 | Libby | G01S 5/02 342/451 |
| 2011/0294448 A1 | 12/2011 | Vauhkonen | |
| 2011/0316695 A1* | 12/2011 | Li | G01S 5/02 340/539.13 |
| 2012/0093108 A1* | 4/2012 | Wengerter | H04W 52/243 370/329 |
| 2012/0106362 A1 | 5/2012 | Reumerman et al. | |
| 2012/0116677 A1 | 5/2012 | Higgison et al. | |
| 2012/0134280 A1* | 5/2012 | Rotvold | H04B 17/24 370/252 |
| 2012/0244875 A1* | 9/2012 | Cardona | G01S 5/0252 455/456.1 |
| 2012/0257558 A1* | 10/2012 | Shin | H04W 52/0229 370/311 |
| 2012/0262327 A1 | 10/2012 | Hester et al. | |
| 2012/0293372 A1 | 11/2012 | Amendolare et al. | |
| 2012/0299702 A1 | 11/2012 | Edara et al. | |
| 2012/0310736 A1 | 12/2012 | Vengroff et al. | |
| 2012/0319844 A1* | 12/2012 | van Doorn | G01S 13/003 340/541 |
| 2013/0003572 A1* | 1/2013 | Kim | H04W 64/00 370/252 |
| 2013/0091472 A1 | 4/2013 | Terai | |
| 2013/0109413 A1* | 5/2013 | Das | H04W 4/04 455/456.6 |
| 2013/0113819 A1 | 5/2013 | Gurusamy | |
| 2013/0121205 A1 | 5/2013 | Backes et al. | |
| 2013/0122803 A1 | 5/2013 | Forster | |
| 2013/0155102 A1* | 6/2013 | Gonia | H04W 64/00 345/629 |
| 2013/0260780 A1 | 10/2013 | Liu et al. | |
| 2013/0260798 A1* | 10/2013 | Moshfeghi | H04W 4/029 455/456.5 |
| 2013/0329581 A1 | 12/2013 | Chen et al. | |
| 2013/0331121 A1* | 12/2013 | Bandyopadhyay | H04W 64/00 455/456.1 |
| 2013/0342565 A1* | 12/2013 | Sridhara | G01C 21/206 345/629 |
| 2014/0011518 A1* | 1/2014 | Valaee | H04W 64/00 455/456.1 |
| 2014/0066088 A1* | 3/2014 | Bhattacharya | H04W 64/00 455/456.1 |
| 2014/0073349 A1* | 3/2014 | Schunk | G01S 5/0252 455/456.1 |
| 2014/0086369 A1* | 3/2014 | Zhang | G01S 5/0205 375/343 |
| 2014/0087751 A1* | 3/2014 | Do | G01S 5/0205 455/456.1 |
| 2014/0087755 A1* | 3/2014 | Schunk | G01S 5/0252 455/456.1 |
| 2014/0120931 A1* | 5/2014 | Shin | H04W 64/00 455/452.1 |
| 2014/0125521 A1* | 5/2014 | Monnerat | G01S 19/22 342/357.61 |
| 2014/0179340 A1* | 6/2014 | Do | G01S 13/765 455/456.1 |
| 2014/0185520 A1* | 7/2014 | Gao | H04W 64/00 370/328 |
| 2014/0194113 A1* | 7/2014 | Ahlstrom | H04W 24/08 455/423 |
| 2014/0274119 A1* | 9/2014 | Venkatraman | H04W 4/043 455/456.1 |
| 2014/0320348 A1* | 10/2014 | Ly Nguyen | G01S 5/14 342/458 |
| 2014/0357196 A1* | 12/2014 | Mayor | H04B 17/21 455/67.11 |
| 2015/0080019 A1* | 3/2015 | Edge | G01S 5/0236 455/456.1 |
| 2015/0087239 A1* | 3/2015 | Yang | H04W 24/08 455/67.11 |
| 2015/0119068 A1* | 4/2015 | Kudekar | H04W 4/043 455/456.1 |
| 2015/0133167 A1* | 5/2015 | Edge | H04W 4/043 455/456.3 |
| 2015/0243158 A1* | 8/2015 | Bassan-Eskenazi | G08B 21/24 340/539.32 |
| 2015/0309183 A1* | 10/2015 | Black | G01S 19/258 342/357.25 |
| 2016/0025498 A1* | 1/2016 | Le Grand | G01C 21/12 701/469 |
| 2016/0077190 A1* | 3/2016 | Julian | G01S 5/0278 342/451 |
| 2016/0077191 A1* | 3/2016 | Julian | G01S 5/0278 342/451 |
| 2016/0080905 A1* | 3/2016 | Julian | H04W 4/025 370/252 |
| 2016/0080908 A1* | 3/2016 | Julian | H04W 4/029 455/457 |
| 2016/0088440 A1* | 3/2016 | Palanki | H04W 4/04 455/456.1 |
| 2016/0127069 A1* | 5/2016 | Nuss | H04W 16/10 370/329 |
| 2016/0150361 A1* | 5/2016 | Zhu | G01S 19/14 455/456.1 |
| 2016/0187144 A1* | 6/2016 | Modica | G01S 17/023 382/154 |
| 2016/0188996 A1* | 6/2016 | Modica | G01S 17/023 382/203 |
| 2016/0316193 A1* | 10/2016 | Gruenwald | H04N 13/0253 |

(56) References Cited

U.S. PATENT DOCUMENTS

| | | | | |
|---|---|---|---|---|
| 2017/0059687 A1* | 3/2017 | Dinesh | | G01S 5/0252 |
| 2017/0074965 A1* | 3/2017 | Lee | | G01S 5/0252 |
| 2017/0090007 A1* | 3/2017 | Park | | G06K 9/00771 |
| 2017/0134899 A1* | 5/2017 | Chan | | H04W 64/00 |
| 2017/0146636 A1* | 5/2017 | Alicot | | G01S 5/0252 |
| 2017/0160377 A1* | 6/2017 | Gonia | | H04W 64/00 |
| 2017/0201865 A1* | 7/2017 | Cho | | H04W 4/026 |
| 2017/0285178 A1* | 10/2017 | Platzer | | G01S 5/16 |
| 2017/0359697 A1* | 12/2017 | Bhatti | | G01S 5/0278 |
| 2017/0371142 A1* | 12/2017 | Anthony | | G02B 21/367 |
| 2018/0007654 A1* | 1/2018 | Wirola | | H04W 4/04 |
| 2018/0063673 A1* | 3/2018 | Jang | | H04B 17/318 |
| 2018/0139717 A1* | 5/2018 | Vered | | H04W 64/00 |
| 2018/0227711 A1* | 8/2018 | Moshfeghi | | H04W 4/029 |
| 2018/0266826 A1* | 9/2018 | Wang | | G01C 21/005 |

OTHER PUBLICATIONS

Papamanthou, Charalampos et al., "Algorithms for Location Estimation Based on RSSI Sampling", Algosensors 2008, LNCS 5389, 2008, pp. 72-86.

Luo, Xiaowei et al. "Comparative evaluation of Received Signal-Strength Index (RSSI) based indoor localization techniques for construction jobsites." Advanced Engineering Informatics, 2010, 9 pages.

Ni, Lionel M. et al. "LANDMARC: Indoor Location Sensing Using Active RFID." Wireless Networks 10, 2004, pp. 701-710.

Koyuncu, Hakan, et al. "A 2D positioning system using WSNs in indoor environment." International Journal of Electrical & Computer Sciences IJECS-IJENS vol. 11. No. 03, Jun. 2011, 8 pages.

Gansemer, S., et al. "3D WLAN Indoor Positioning in Multi-Storey Buildings." IEE International Workshop on Intelligent Data Acquisition and Advanced Computing Systems: Technology and Applications, Sep. 2009, 4 pages.

Lien, Yao-Nan, "Phantom Positioning Technology for Indoor WLAN." WPMC 2006, San Diego, CA, Sep. 2006, 5 pages.

U.S. Appl. No. 13/331,564, Office Action, dated Sep. 13, 2013, 38 pages.

U.S. Appl. No. 13/331,564, Final Office Action, dated Jan. 17, 2014, 49 pages.

U.S. Appl. No. 13/331,564, Office Action, dated May 21, 2014, 57 pages.

U.S. Appl. No. 13/331,564, Final Office Action, dated Aug. 1, 2014, 62 pages.

U.S. Appl. No. 13/331,564, Office Action, dated Jan. 15, 2015, 69 pages.

U.S. Appl. No. 13/331,564, Examiner's Answer, dated Jun. 3, 2015, 65 pages.

U.S. Appl. No. 13/331,564, Decision on Appeal, dated Dec. 22, 2016, 10 pages.

* cited by examiner

= POSSIBLE REGION FOR THE LOCATION OF AN RSSI RECEIVER GIVEN SIGNAL STRENGTH AT THE RECEIVER AND LOCATION $S_1$ OF LOCATION ANCHOR

SYSTEMS AND METHODS OF ACCURACY MAPPING IN A LOCATION TRACKING SYSTEM

CROSS REFERENCE TO RELATED APPLICATION

This application is a continuation of U.S. patent application Ser. No. 13/331,564 (entitled SYSTEM AND METHODS OF ACCURACY MAPPING IN A LOCATION TRACKING SYSTEM filed Dec. 20, 2011) which is incorporated herein by reference in its entirety.

FIELD

The present invention relates generally to location tracking systems. More particularly, the present invention relates to systems and methods of accuracy mapping in a location tracking system.

BACKGROUND

Location tracking systems are known in the art. However, many location tracking systems, both wired and wireless, exhibit location estimation errors. Often times, these location estimation errors are specific to a user's location or specific to hardware and infrastructure of the location tracking system. For example, the accuracy of a location estimate can depend on the location and structure of access points or location anchors.

It is desirable for a user to understand the accuracy of any location estimate. Specifically, it is desirable for a user to know what to expect in terms of accuracy of a location tracking system based on the user's location and the hardware and infrastructure in the environment. When a user understands accuracy and knows what level of error to expect, he can adjust the infrastructure to enhance accuracy according to his requirements.

There is thus a continuing, ongoing need for systems and methods of accuracy mapping in a location tracking system. Preferably, such systems and methods predict and communicate to a user the expected accuracy of a location estimate on a site map.

DETAILED DESCRIPTION

Figure 1A:
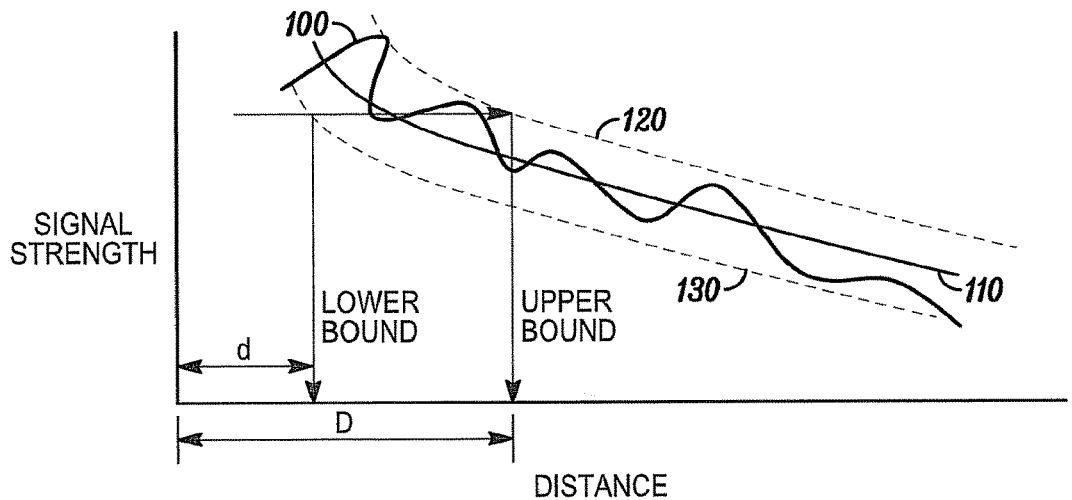
FIG. 1A is a graph of signal strength versus distance in accordance with the present invention.

While this invention is susceptible of an embodiment in many different forms, the drawings and detailed description show and describe specific embodiments of the present invention. However, it is to be understood that the present disclosure is to be considered as an exemplification of the principles of the invention. It is not intended to limit the invention to the specific illustrated embodiments.

Embodiments of the present invention include systems and methods of accuracy mapping in a location tracking system. Preferably, such systems and methods predict and communicate to a user the expected accuracy of a location estimate on a site map.

In accordance with the present invention, predicting and communicating the accuracy of a location estimate on a site map can enable a user to visualize location accuracy when needed. The wireless infrastructure at a site can affect the location accuracy. Therefore, when users know the accuracy of any location estimate, users can optimize infrastructure deployment where needed. Accordingly, accuracy requirements can be achieved at a minimized infrastructure cost.

In embodiments of the present invention, systems and methods can create a graphical topology map, and a graphical user interface (GUI) can present the map to a user based on an imported customer site image. In some embodiments, the graphical topology map can include an overlaid contour map, for example, a color contour map similar to a thermal image heat map. In a heat map, color indicates temperature. However, in the color contour map shown and described herein, color can indicate the predicted location accuracy.

The color contour map overlay on the site image can communicate to a user the expected worst case error versus position in the site. According to some embodiments, the expected worst case error can be predicted based on the positions of location anchors.

It is to be understood that the rendering of the site can be two-dimensional or three-dimensional. In three-dimensional embodiments, a user can view the overlaid contours of the expected worst case error as would exist in the three-dimensional space of the site.

A contour map or a three-dimensional rendering in accordance with the present invention can take into account the placement of location anchors to be used in the estimation of location accuracy. According to some embodiments, the estimation of location accuracy at any given point in the site depends on the Euclidean distance to nearby location anchors. Therefore, it is important to specify the location of all location anchors in the site.

The estimation of location accuracy can also depend on the methods used for estimating location in the location system. For example, one method for location estimation is based on the received signal strength indication (RSSI) for signals received from location anchors. In these methods, the RSSI is used as an indicator for distance. It is to be understood that the method for estimating location accuracy is not limited to location systems based on RSSI measurements. Rather, other methods for estimating location come within the spirit and scope of the present invention, for example, time of flight measurements.

In embodiments of the present invention, a location anchor can include a wireless receiver, transmitter, or transceiver that has a known location. For example, a location anchor could include a Wi-Fi access point (AP). In some embodiments, a location anchor can include a mechanism for responding to a probe request received from a Wi-Fi client device.

In some embodiments, the position of a location anchor can be specified by receiving Global Positioning System (GPS) coordinates of the location anchor. If multiple GPS coordinates of the site rendering are known, then the position of a location anchor within the site can be known with respect to the site rendering.

In other embodiments, a contour map can be displayed on a GUI, and a user can click on or otherwise select a point at which a location anchor is located. Then, that point on the map can display the location anchor.

After all of the location anchor positions are determined, systems and methods in accordance with the present invention can predict a worst case location accuracy as a function of position on the site rendering. The prediction will depend on the location of the location anchors in the site and on the method used to determine location. It is to be understood that the average accuracy can be better than the worst case accuracy in many situations.

One method to determine location can use a function of a default received signal strength indication (RSSI) versus Euclidean distance. For example, U.S. application Ser. No. 12/959,250, which is assigned to the assignee hereof and is hereby incorporated by reference, describes a location engine that can estimate the distance from all location anchors in a region using signal strength. The method can use the signal strength and estimated distance from location anchors to estimate the location of a receiver. However, the estimated location of the receiver can exhibit an error that is due to the inaccuracy of the function of RSSI versus distance.

Radio frequency signal strength can vary, even if a location anchor and receiver stay in constant positions. Systems and methods of the present invention can account for this variance by determining the variation of RSSI versus distance to determine reliable bounds. For example, as seen in FIG. 1A, a graph of signal strength versus distance is shown. Line 100 depicts the typical wide variations in RSSI versus distance while line 110 depicts the average RSSI versus distance. The dotted lines 120, 130 depict the upper and lower bound curves, respectively, around the average, where the limits include a majority of the typical measurements.

Figure 1B:
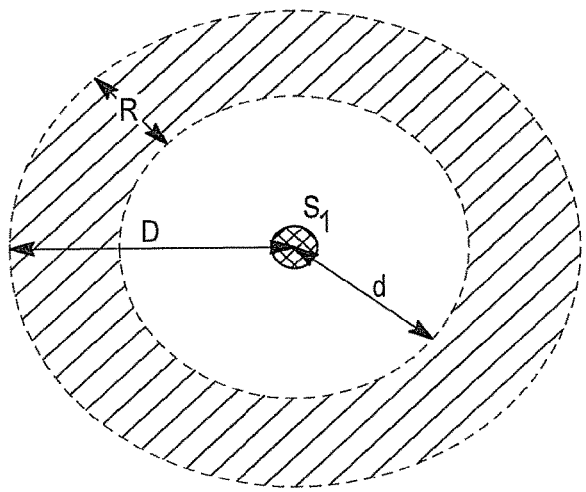
FIG. 1B is graph plotting a possible region for the location of an RSSI receiver in accordance with the present invention.
Figure 1B:
Figure 1C:
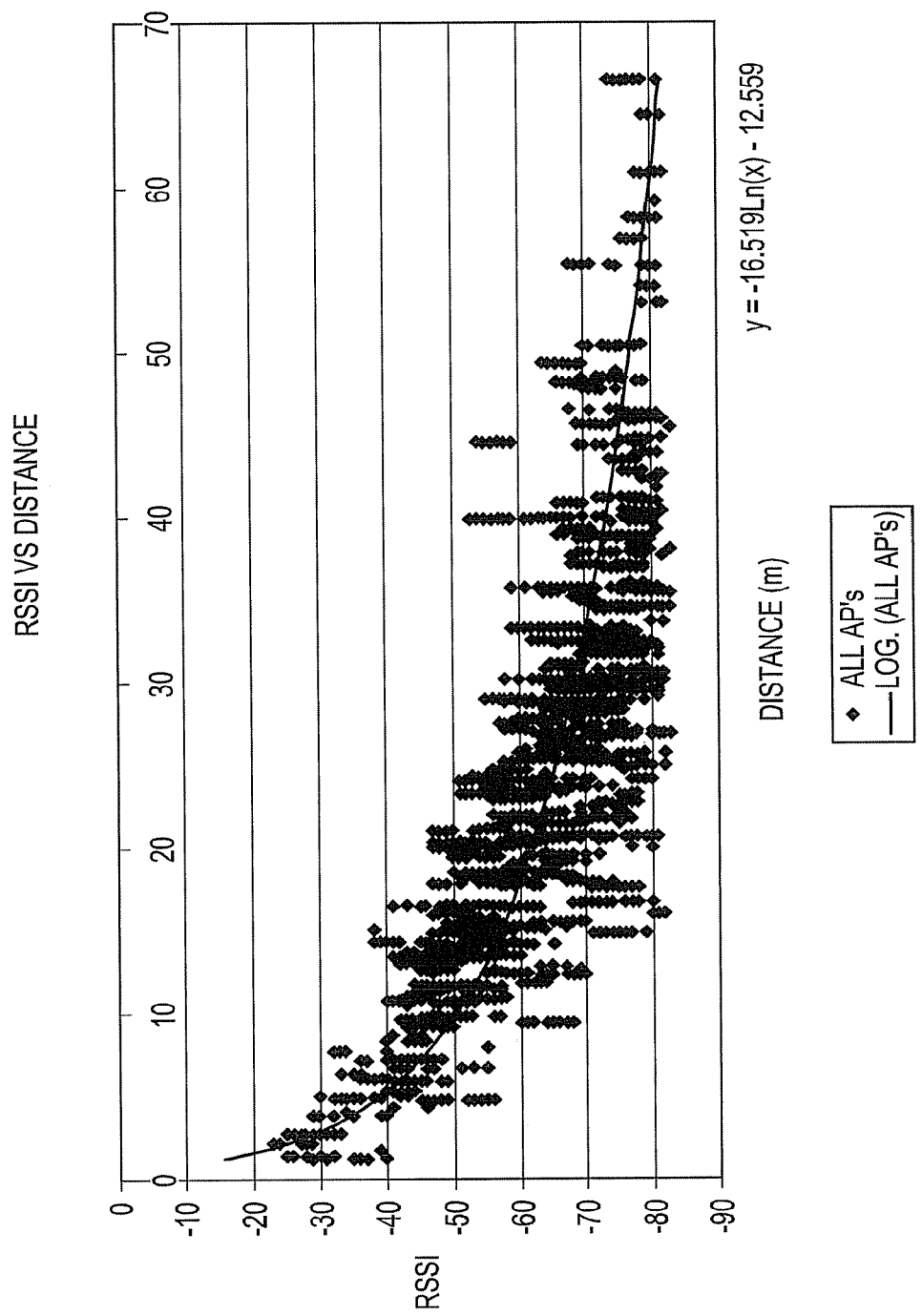
FIG. 1C is a graph depicting the statistical variation of RSSI versus distance measurements in accordance with the present invention.

FIG. 1C is a graph depicting the statistical variation of RSSI versus distance measurements. The upper bound curve 120 and the lower bound curve 130 in FIG. 1A can be determined based on the statistical variation shown in FIG. 1C. That is, the confidence level for the upper and lower bound curve 120, 130 can be dependent on the standard deviation of the statistics at any given distance in FIG. 1C.

In a normal distribution, one standard deviation from the mean can account for approximately 68.27% of a set. Two standard deviations from the mean can account for approximately 95.45% of the set, and three standard deviations from the mean can account for approximately 99.73% of the set. Therefore, if a user desires a 95% confidence, then the upper and lower bound lines 120, 130 can be set at two standard deviations away from the mean for each distance position.

FIG. 1B shows a plot predicting a possible region for the location of an RSSI receiver given the signal strength measured when the signal is transmitted from the location anchor at position $S_1$. As seen in FIG. 1B, D can be an upper distance bound, and d can be a lower distance bound. When a signal strength is known, a region R in which the receiver can be located can be determined. That is, d<R<D.

According to some embodiments, the values of d and D can be used to estimate the location error for a given position in the site. For example, the values for d and D can be determined by determining the Euclidean distance from a position to a location anchor. Then, the average RSSI value for that Euclidean distance can be determined using the RSSI versus distance curve 110 shown in FIG. 1A. Using the determined RSSI value, the values of d and D can be determined using the upper and lower bound lines 120, 130, shown in FIG. 1A. Thus, as shown in FIG. 1B, a user can be 95% confident that the receiver is within the region R of FIG. 1B surrounding the position of the location anchor $S_1$.

Figure 2:
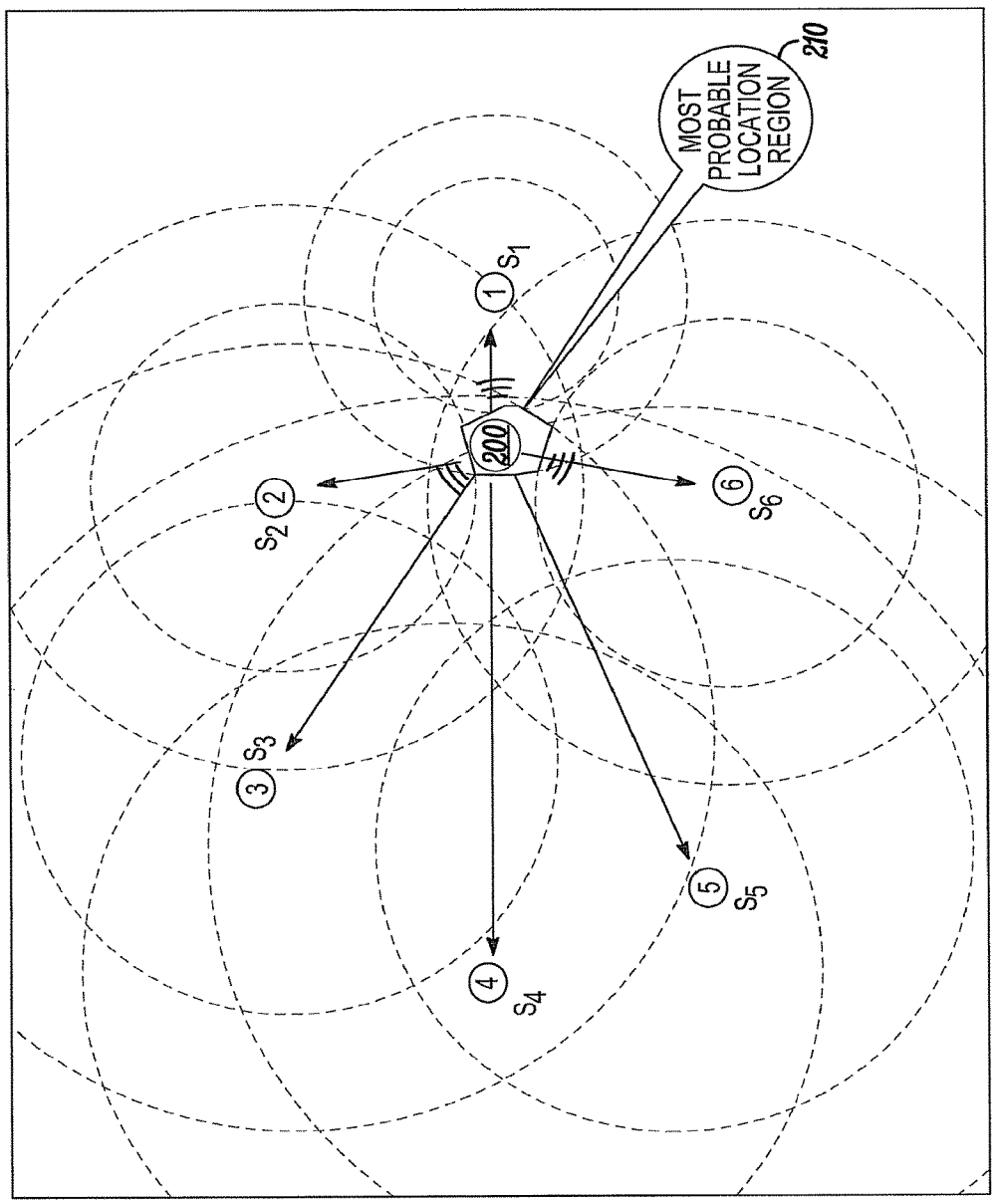
FIG. 2 is a graph plotting the most probable region for the location of an RSSI receiver when RSSI from multiple location anchors are available in accordance with the present invention.

When multiple location anchor signals are received by the RSSI receiver, the location of the RSSI receiver can be predicted even more accurately. For example, as seen in FIG. 2, regions in which a receiver can be located can be determined for each of a plurality of location anchors, $S_1$-$S_6$. Then, systems and methods can determine a location in which each of the regions overlap. This overlap area can be the most probable location region 210 for the receiver 200.

In some embodiments, the size of the most probable location region 210 can be used to report the estimated error in the location estimate for the particular position in the site. A similar calculation can be done to determine the error for all other positions in the site.

The confidence that a given location estimate will be within the most probable location region 210 can depend on the upper and lower bound RSSI curves. For example, if the curves are positioned to be two standard deviations above and below the average curve, then 95% of the RSSI measurements can occur between the upper and lower bound curves. Thus, in FIG. 2, a user can be 95% confident that the receiver 200 is within the most probable location region 210.

In some embodiments, the shape of the most probable location region 210 can be based on a set of circular arcs, each circular arc having a radius D. Then, the estimated location error can be reported as the square root of this area. In other embodiments, the shape of the most probable location region 210 can be estimated using squares having a width equal to 2 D. Then, the shape of the most probable location region 210 can be a bounding box rectangle with dimensions X and Y, where the rectangle is the intersection of all of the squares for each location anchor. The largest of the X and Y dimensions can be used as the estimated error for that position. The confidence in an error estimate can be depend on the number of standard deviations used for the upper and lower bound curves.

According to embodiments disclosed herein, a contour map of the entire site can be generated using the calculations described above for each possible receiver location. Once each location has a calculated error value, contour lines can be drawn overlaying the map such that each contour line can correspond to a specific common error value.

In three-dimensional embodiments, the Euclidean distance can be measured in three dimensions. Thus, circles of radius D can become spheres, and the most probable location can become a three-dimensional volume. In these embodiments, the cube root of the volume can be used as the error value.

Users can adjust the function of default RSSI versus distance according to their environment. Furthermore, a user can provide input specifying a desired worst case level of confidence in location accuracy. Given the desired confidence, the number of RSSI standard deviations to be used for the upper and lower bounds can be determined. An RSSI standard deviation value can be changed as appropriate for the environment.

In some embodiments, the RSSI standard deviation value can be approximately 5-7 dB. However, the desired confidence can be 95% where the upper and lower bound curves can be positioned at approximately two standard deviations above and below the RSSI curve. This is because higher standard deviations can capture more measurements. For any set of location anchor positions, RSSI statistics, and user confidence specification, an error contour overlay can be calculated and displayed.

In accordance with the present invention, a user can add or move location anchors to increase the accuracy of location estimates in desired areas. When a location anchor is added or moved, systems and methods of the present invention can generate an inventory of the move or addition. Systems and methods can then use the inventory to perform a tradeoff analysis of cost installation versus accuracy.

Figure 3:
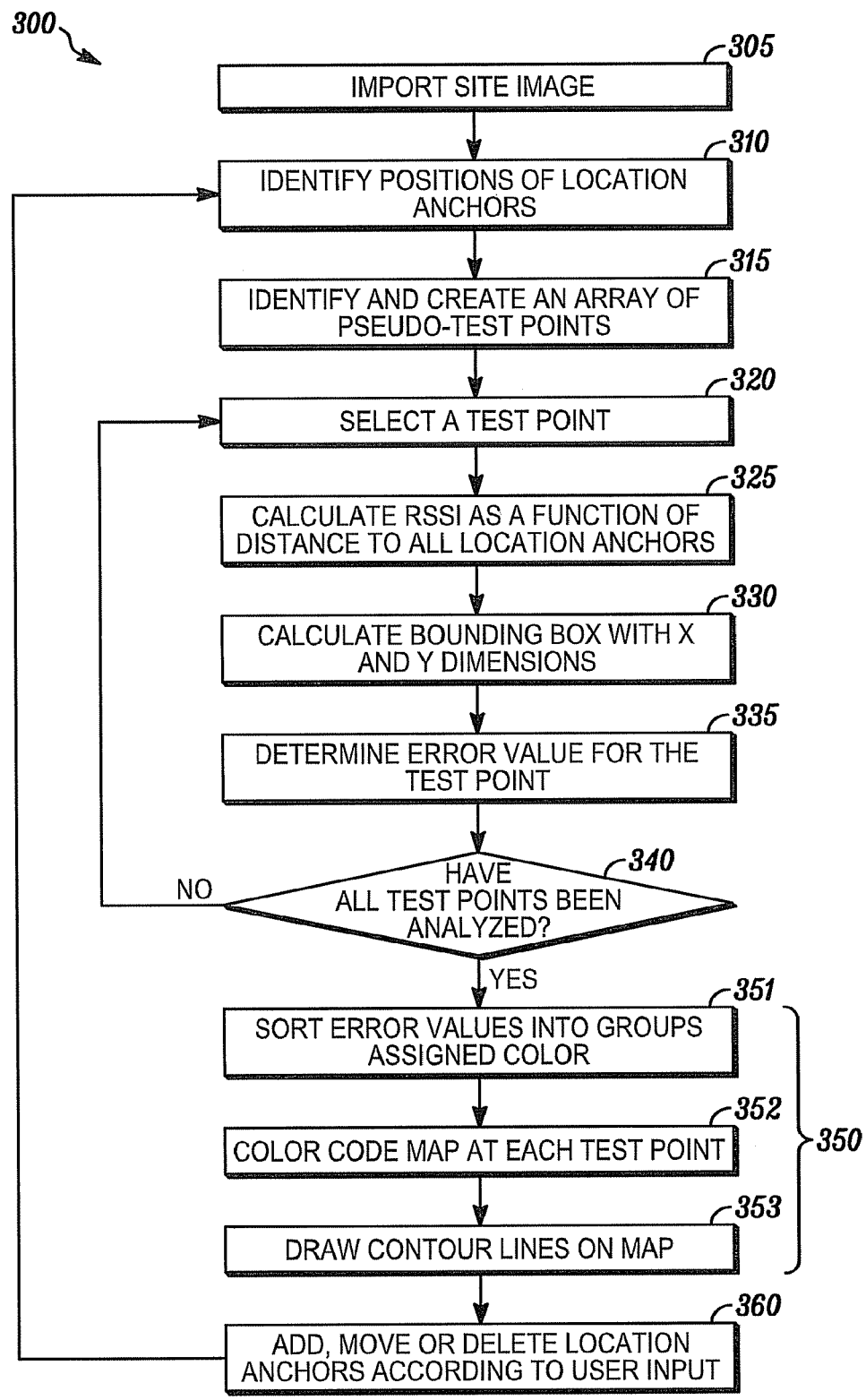
FIG. 3 is a method of predicting and communicating the accuracy of a location estimate in a location tracking system in accordance with the present invention.

FIG. 3 is a flow chart of an exemplary method 300 of predicting and communicating the accuracy of a location estimate in a location tracking system in accordance with the present invention. As seen in FIG. 3, an image of a site or region can be imported as in 305. Alternatively, a three-dimensional rendering of the site can be used, for example, a three-dimensional AutoCAD model.

In some embodiments, location anchors can be shown on the imported image, and in other embodiments, location anchors do not appear on the imported image. Accordingly, location anchors can be optionally identified on the image as in 310. For example, a user can click on or otherwise select locations on the image where anchors are currently located and/or where anchors are anticipated to be located. Upon completion of step 310, positions of location anchors can be known with respect to the site image or three-dimensional model.

Then, the method 300 can identify and create an array of pseudo-test points as in 315. For example, the pseudo-test points can be a set of points that are equidistant and that cover the entire site image or three-dimensional model. Pseudo-test points can enable the method 300 to prepare values of location error for positions across the site.

The method can select a pseudo-test point from the array of pseudo-test points as in 320. Then, for the selected pseudo-test point, the method 300 can calculate the RSSI as a function of distance from all location anchors on the site as in 325. For example, in some embodiments, the calculation of RSSI versus distance can be based on a default RSSI versus distance function. In some embodiments, the mean value and expected standard deviation of RSSI can be determined as a function of distance, for example, through measurements obtained in an RF site survey at each pseudo-test point and/or through an RF propagation model that takes into account the presence of equipment and buildings on the site map.

The method 300 can also calculate a bounding box with X and Y dimensions as in 330. The bounding box can be based on using an upper bound RSSI curve to determine the size of the squares for each location anchor. In embodiments of the present invention, the bounding box can be based on the farthest distance that the estimate can range given the variance in the RSSI function. Then, the X and Y dimensions of the bounding box can be used to determine the error value for that pseudo-test point as in 335, for example, $\sqrt{(XY)}$ or the maximum of X and Y.

Portions of the method 300 can be repeated to generate error values for each pseudo-test point. For example, after an error value for the selected pseudo-test point is determined as in 335, the method 300 can determine if all pseudo-test points in the array of pseudo-test points have been analyzed as in 340. If not, then the method 300 can select another pseudo-test point as in 320.

However, if the method determines that all pseudo-test points have been analyzed as in 340, then the method 300 can generate a contour map as in 350. For example, to generate the contour map as in 350, the error values that were determined in 335 can be sorted into groups and assigned a color as in 351. For example, a good error value can be assigned to a green group, and a bad error value can be assigned to a red group. Then, the map can be color coded at each pseudo-test point as in 352, and contour lines can be drawn accordingly as in 353. In embodiments of the present invention, a colored map with contour lines can show color coding of the magnitude of location estimation error versus the position on the image.

In some embodiments, after a user visually views location accuracy via the contour map, a user can adjust accuracy by adding, moving, or deleting location anchors on the map as in 360. When any location anchors are added, moved, or deleted, location error mapping functions can be re-run to re-calculate accuracy.

When the method of FIG. 3 generates a contour map with a desired location accuracy, systems and methods of the present invention can generate a bill of materials. For example, the bill of materials can indicate materials needed to install a system with the location accuracy displayed by the contour map. If an initial set of location anchors is already installed, the bill of materials can indicate the additional materials needed to improve the location accuracy by adding additional location anchors.

Figure 4:
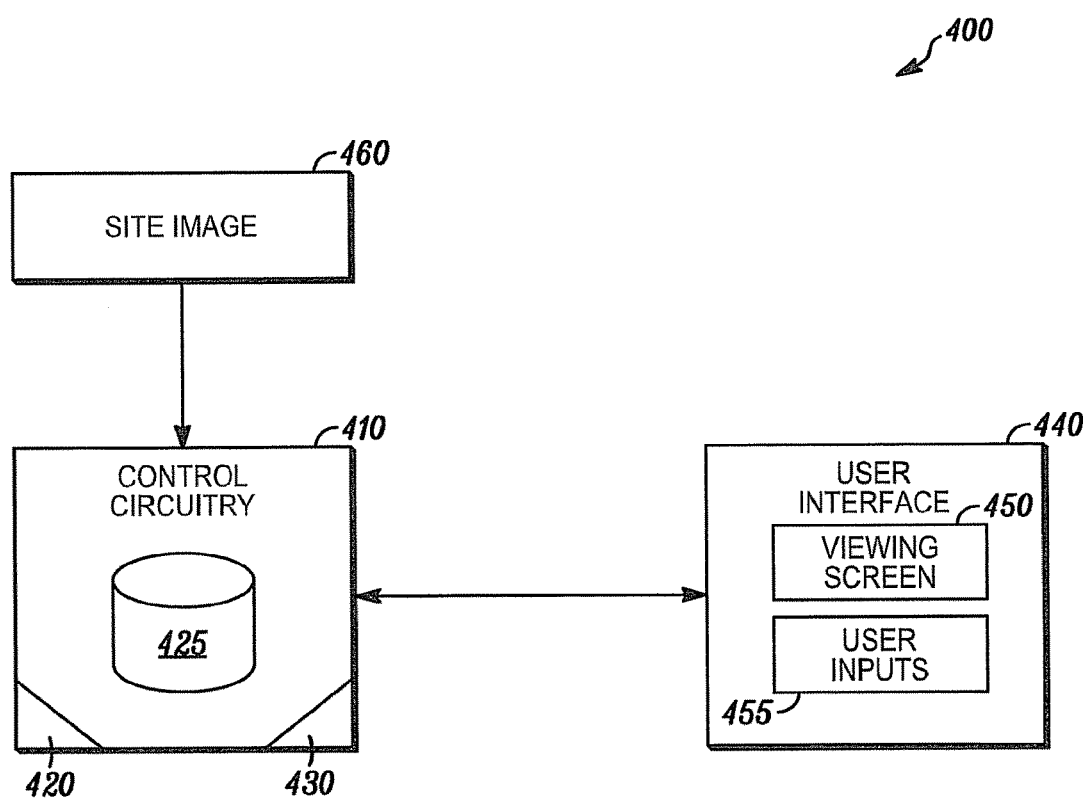
FIG. 4 is a block diagram of a system for carrying out the method of FIG. 3 and others in accordance with the present invention.

The method shown in FIG. 3 and others in accordance with the present invention can be implemented with the system 400 shown in FIG. 4. As seen in FIG. 4, the system 400 can include control circuitry 410, one or more programmable processors 420, executable control software 430 as would be understood by those of skill in the art, and a database 425. The executable control software 430 can be stored on a transitory or non-transitory computer readable medium.

An associated user interface 440 can be in communication with the control circuitry 410, and a viewing screen 450 of the user interface 440, as would be known by those of skill in the art, can display interactive and viewing windows. In some embodiments of the present invention, the user interface 440 can be a multi-dimensional graphical user interface. The user interface 440 can also include user input mechanisms 455 for receiving user input.

As seen in FIG. 4, an image 460 of a site or region can be imported to the control circuitry 410. The control circuitry 410 can perform methods in accordance with the present invention to generate a contour map, and the viewing screen 450 of the user interface 440 can display the contour map as an overlay on top of the site image to visually display to a user the accuracy of location estimates.

In some embodiments, the viewing screen can display a three-dimensional rendering of the site with various perspectives. Then, the contour and color coded error information can be displayed on the site rendering to convey the location error information.

It is to be understood that alternate embodiments to enable the viewing of a three-dimensional model come within the spirit and scope of the present invention. For example, layers of a three-dimensional model can be viewed, where a given layer represents a specific horizontal slice through three-dimensional space. In these embodiments, the error map can be overlaid on each layer. In other embodiments, the overlay can be presented to a user with a controlled level of transparency such that the underlying site image can be more or less visible with respect to the error color coding and contours.

Figure 5:
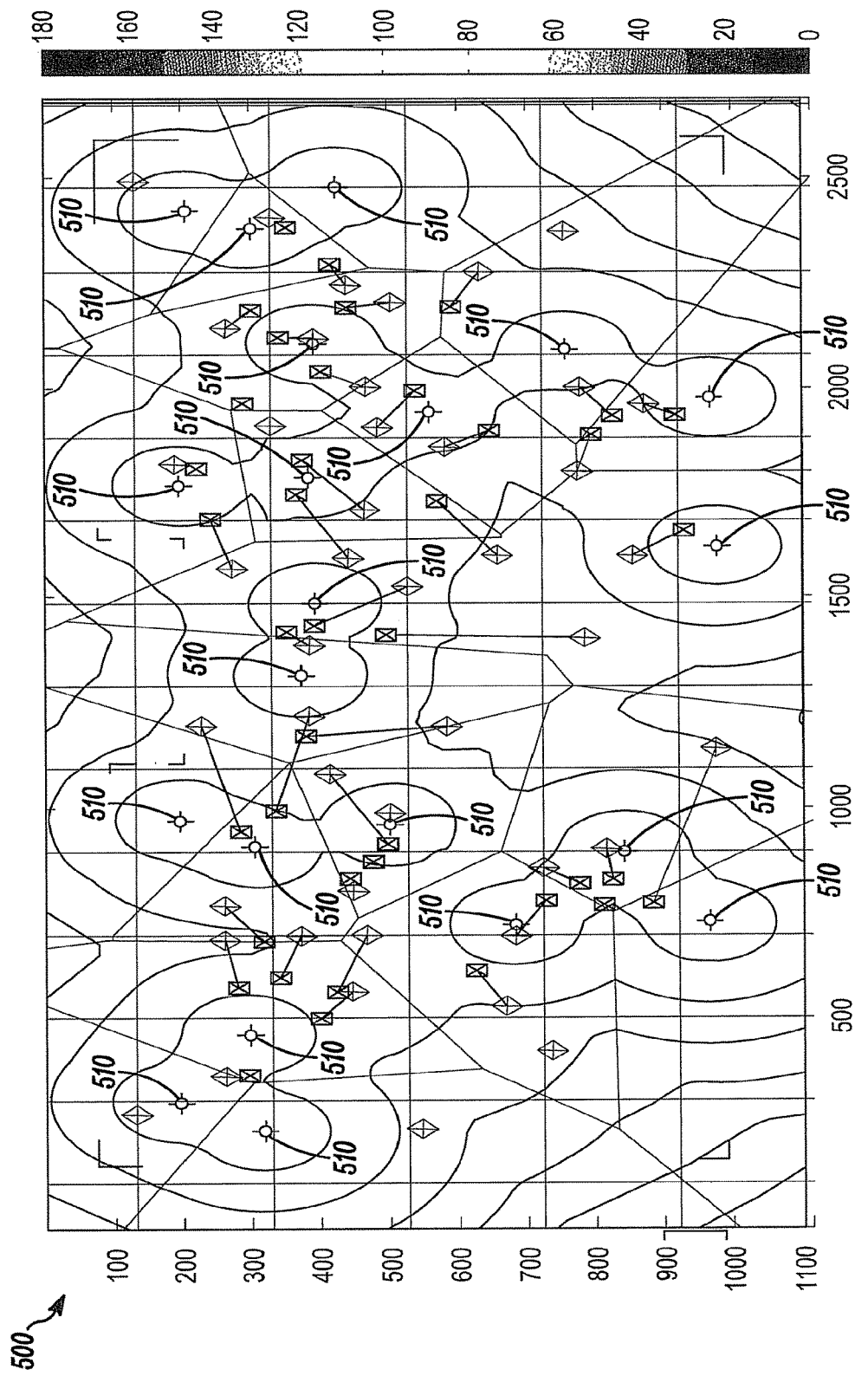
FIG. 5 is an exemplary contour map that can be generated and displayed in accordance with the present invention.

FIG. 5 is an exemplary contour map 500 that can be generated and displayed in accordance with the present invention. As seen in FIG. 5, the contour map 500 can include a plurality of location anchors 510. To generate the contour map 500, the upper bound RSSI curve has been set to 7 dB above the mean RSSI curve.

Figure 6:
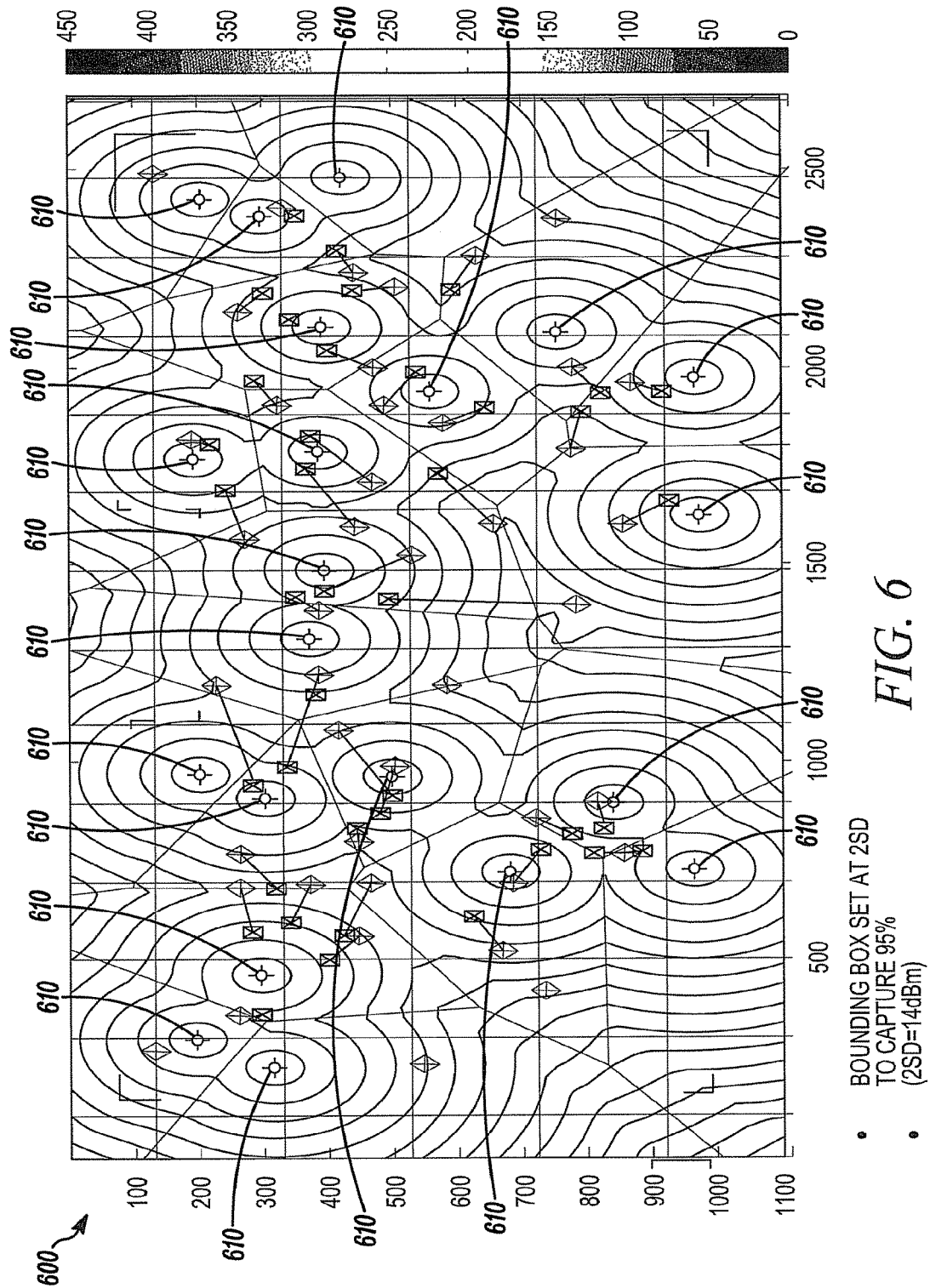
FIG. 6 is an exemplary contour map that can be generated and displayed in accordance with the present invention.

FIG. 6 is an exemplary contour map 600 that can be generated and displayed in accordance with the present invention. As seen in FIG. 6, the contour map 600 can include a plurality of location anchors 610. To generate the contour map 600, the upper bound RSSI curve has been set to 14 dB above the mean RSSI curve.

When the contour map 500 in FIG. 5 and the contour map 600 in FIG. 6 are compared, it can be seen that greater accuracy in location estimates is achieved when the upper bound RSSI curve is 7 dB, as opposed to 14 dB. FIG. 6 also demonstrates additional contours. The number of contours, or alternatively, the incremental amount of error between contours, can be a user input to the mapping system.

Figure 7:
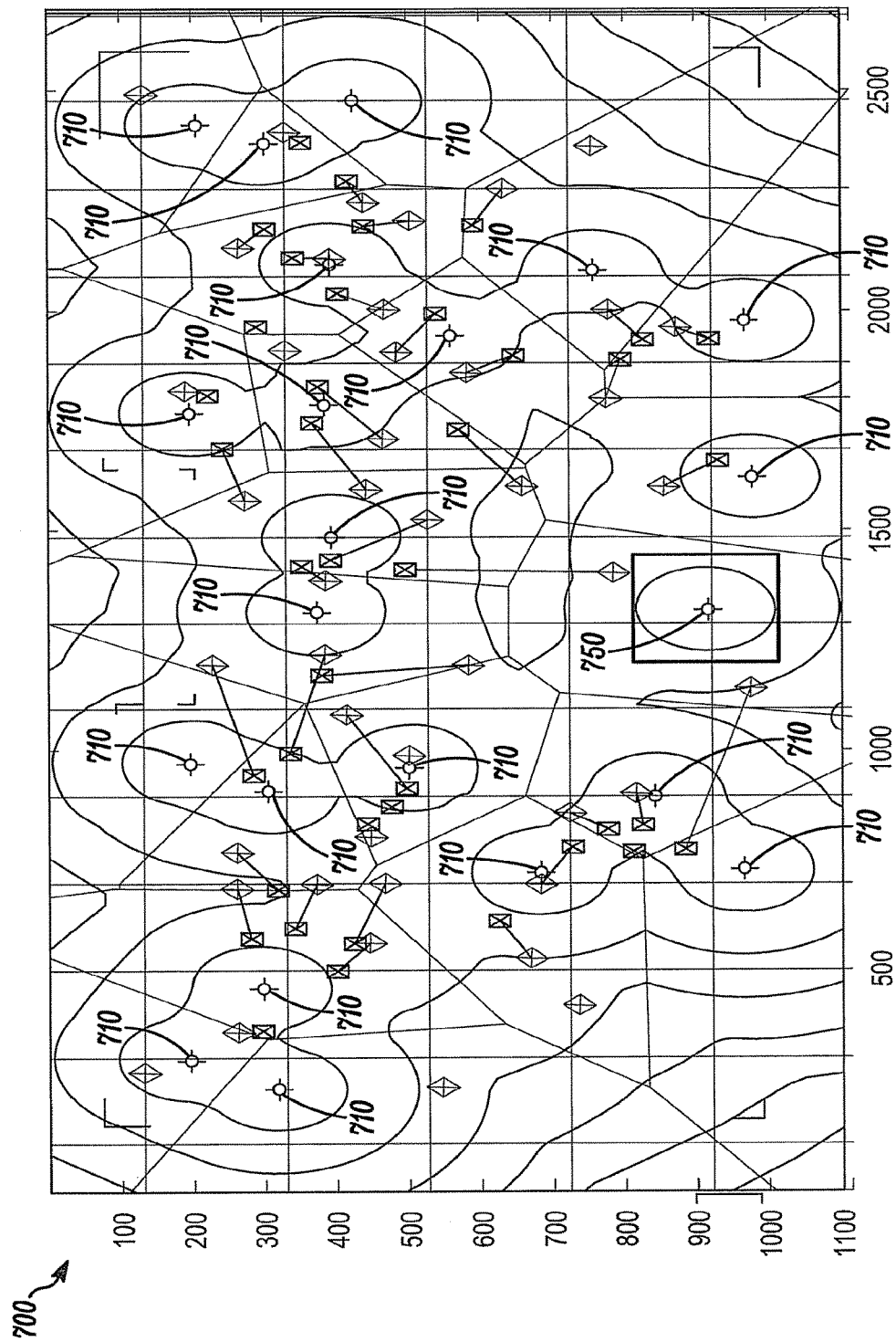
FIG. 7 is an exemplary contour map that can be generated and displayed in accordance with the present invention.

FIG. 7 is an exemplary contour map 700 including location anchors 710 that can be generated and displayed in accordance with the present invention. To generate the contour map 700, the upper bound RSSI curve has been set to 7 dB above the mean RSSI curve.

As seen in FIG. 7, a location anchor 750 has been added to the map 700 so the map 700 in FIG. 7 has more location anchors than the map 500 in FIG. 5. Accordingly, greater accuracy in location estimates is achieved as compared to the map 500 in FIG. 5, especially around the area of location anchor 750.

Figure 8:
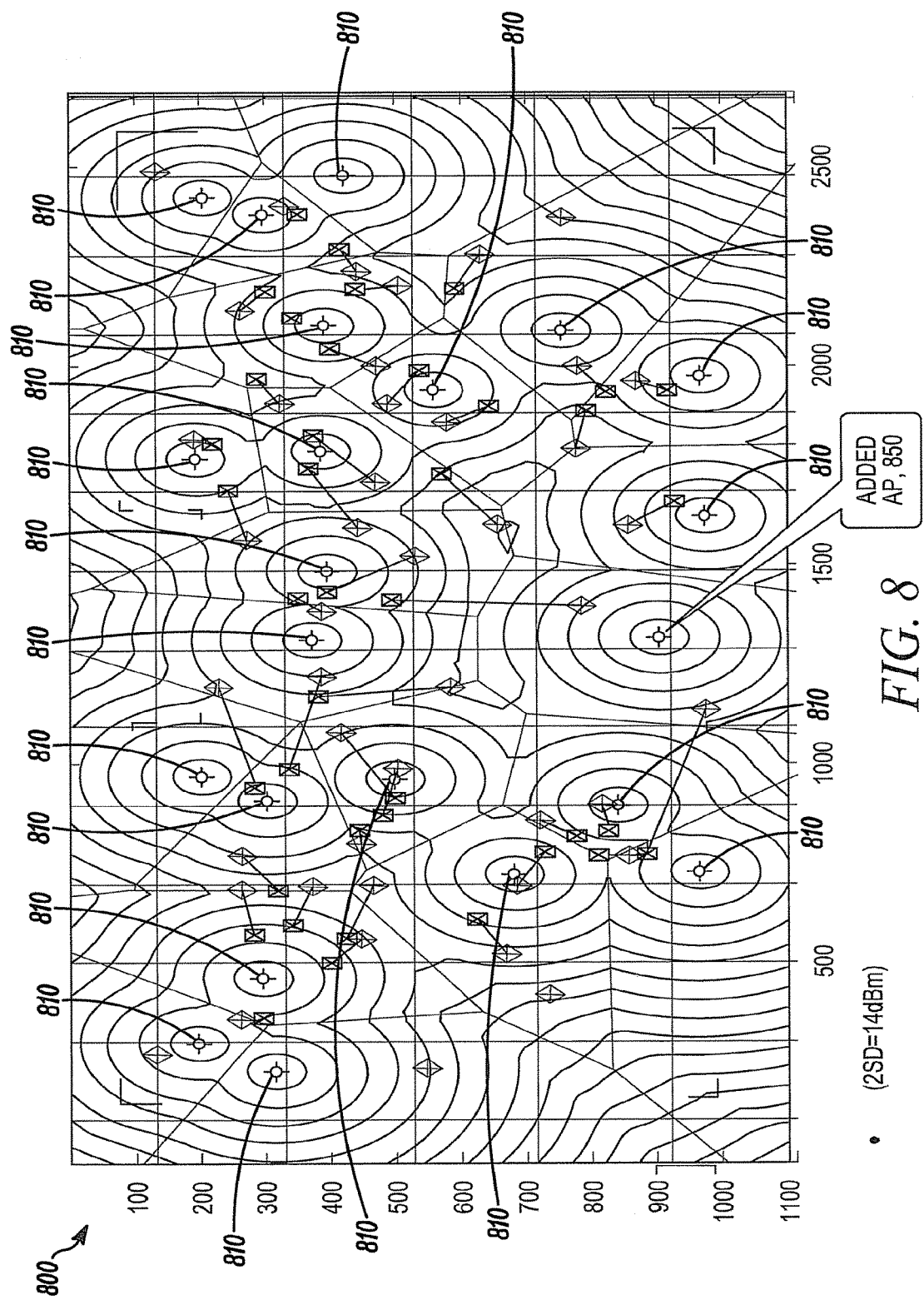
FIG. 8 is an exemplary contour map that can be generated and displayed in accordance with the present invention.

FIG. 8 is an exemplary contour map 800 including location anchors 810 that can be generated and displayed in accordance with the present invention. To generate the contour map 800, the upper bound RSSI curve has been set to 14 dB above the mean RSSI curve.

As seen in FIG. 8, a location anchor 850 has been added to the map 800 so the map 800 in FIG. 8 has more location anchors than the map 600 in FIG. 6. Accordingly, greater accuracy in location estimates is achieved as compared to the map 600 in FIG. 6, especially around the area of location anchor 850.

Figure 9:
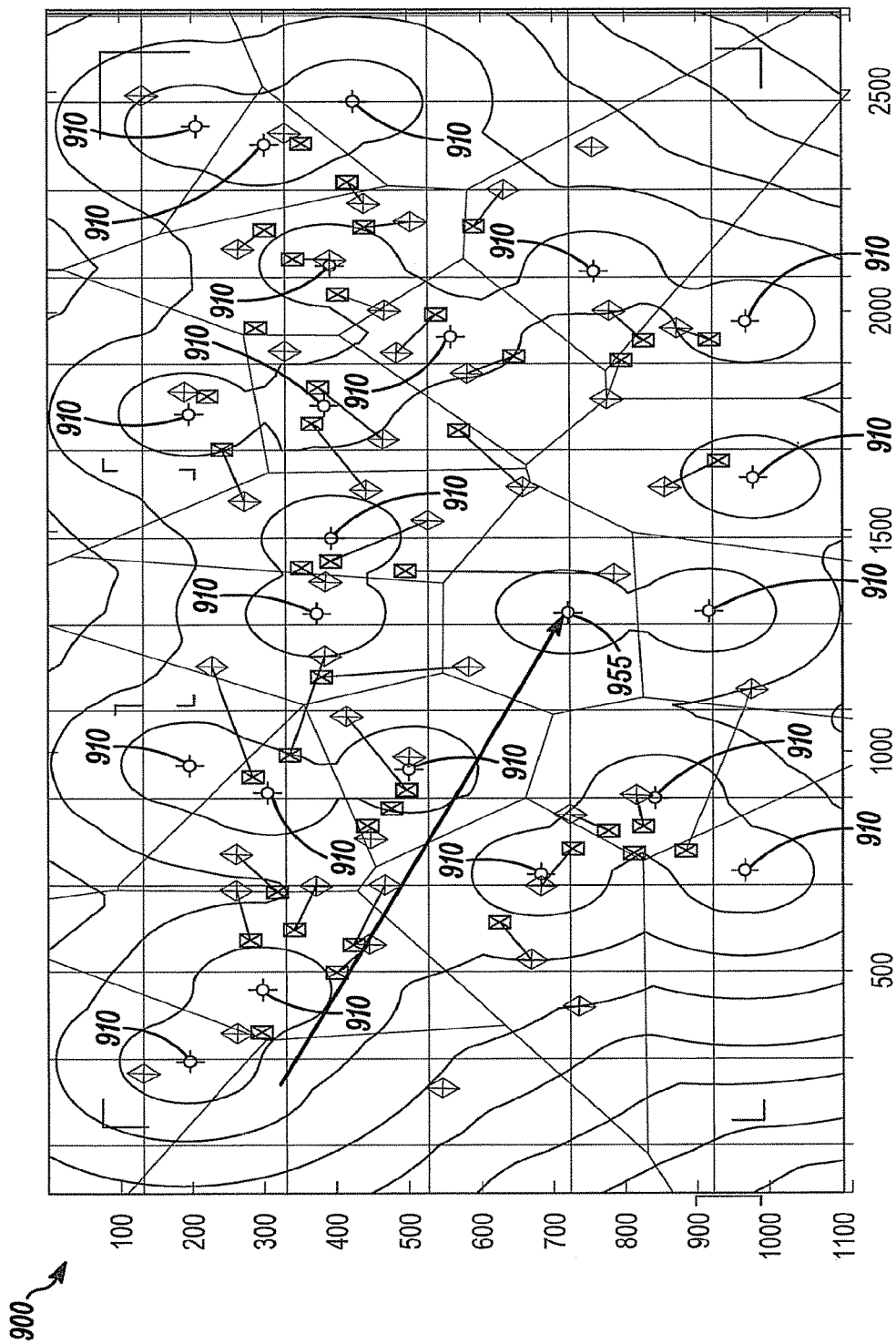
FIG. 9 is an exemplary contour map that can be generated and displayed in accordance with the present invention.

FIG. 9 is an exemplary contour map 900 including location anchors 910 that can be generated and displayed in accordance with the present invention. To generate the contour map 900, the upper bound RSSI curve has been set to 7 dB above the mean RSSI curve.

As seen in FIG. 9, and as compared to FIG. 7, a location anchor 955 has been moved. That is, the anchor 955 has been moved from the location at the base of the arrow to the location at the tip of the arrow. In the map 900, greater accuracy in location estimates is achieved near and around the moved location anchor 955 as compared to that same area in the map 700, when the location anchor 955 was not there.

In embodiments of the present invention, when a user views the map 700 as in FIG. 7, he may determine that more accuracy in location estimates in desired in a certain area. Therefore, he can move the location anchor 955 to the area where more accuracy is desired.

Figure 10:
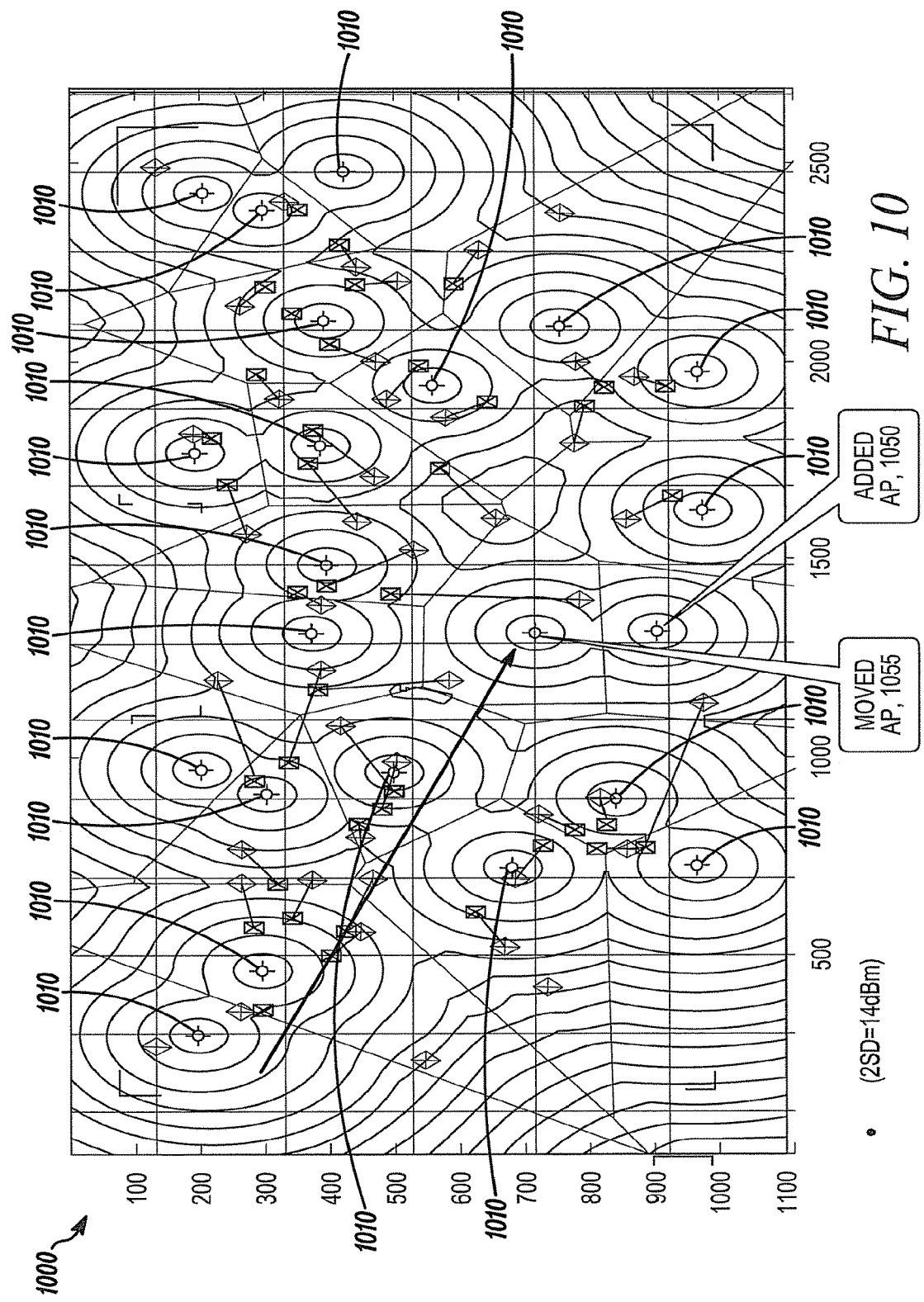
FIG. 10 is an exemplary contour map that can be generated and displayed in accordance with the present invention.

Finally, FIG. 10 is an exemplary contour map 1000 including location anchors 1010 and added location anchor 1050 that can be generated and displayed in accordance with the present invention. To generate the contour map 1000, the upper bound RSSI curve has been set to 14 dB above the mean RSSI curve.

As seen in FIG. 10, and as compared to FIG. 8, a location anchor 1055 has been moved. That is, the anchor 1055 has been moved from the location at the base of the arrow to the location at the tip of the arrow. In the map 1000, greater accuracy in location estimates is achieved near and around the moved location anchor 1055 as compared to that same area in the map 800, when the location anchor 1055 was not there.

In embodiments of the present invention, when a user views the map 800 as in FIG. 8, he may determine that more accuracy in location estimates is desired in a certain area. Therefore, he can move the location anchor 1055 to the area where more accuracy is desired.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. A method comprising:
   identifying a position of each of a plurality of location anchors or a site rendering;
   determining by measuring a wireless signal, for a plurality of positions on the site rendering, an upper bound and a lower bound of an estimated error value of location accuracy as a function of position on the site rendering where the upper and lower bounds of the estimated error value are respective Euclidean distances from each of at least two of the plurality of location anchors;
   forming a bounding box with dimensions X and Y around each of the plurality of positions based upon intersections of the respective upper and lower bounds of the at least two location anchors, wherein forming the bounding box comprises:
      creating an array of pseudo-test points, wherein the pseudo-test points are a set of points that are equidistant from two of the plurality of location anchors and are positioned to cover the site rendering entirely, thereby enabling a preparation of values of location errors for positions across a site;

calculating a received signal strength indication (RSSI) as a function of Euclidean distance from the plurality of location anchors, for each of the pseudo-test points;

calculating an expected standard deviation of RSSI; and calculating X and Y such that the respective upper and lower bounds are based upon the standard deviation of RSSI for the pseudo-test points;

generating an overlay rendering of the estimated error values of location accuracy for the plurality of positions on the site rendering Where each estimated error value of the estimated error values is a relatively larger value of the X and Y dimensions of the bounding box of the associated position or a square root of an area of the bounding box; and displaying the site rendering with the overlay rendering therewith.

2. The method of claim 1, wherein the overlay rendering includes a set of contours of common error values.

3. The method of claim 1, wherein identifying the position of each of the plurality of location anchors on the site rendering includes at least one of receiving coordinates of the position or receiving user input identifying the position as a position with respect to the site rendering.

4. The method of claim 3, further comprising:
receiving user input specifying a limit to the estimated error value for at least one specified area or volume in the site rendering; and
generating a set of recommended coordinates for at least one location anchor of the plurality of location anchors, wherein the estimated error value is less than the limit for all positions within the at least one specified area or volume.

5. The method of claim 4, wherein a first specified area is associated with a first limit, wherein a second specified area is associated with a second limit, wherein the first limit is different from the second limit, and wherein the set of recommended coordinates for the at least one location anchor is adjusted to ensure the estimated error value is less than the respective limit for each specified area.

6. The method of claim 5, further comprising:
providing a pre-existing set of location anchors; and
generating the set of recommended coordinates using coordinates of the pre-existing set of location anchors and adding coordinates for an additional set of location anchors to ensure the estimated error value is less than the respective limit for each specified area.

7. The method of claim 6, further comprising providing a bill of materials for the additional set of location anchors.

8. The method of claim 1, wherein identifying the position of the at least one of the plurality of location anchors on the site map includes receiving the position of the at least one location anchor as GPS coordinates.

9. The method of claim 1, wherein determining, for the plurality of positions on the site rendering, the estimated error value of location accuracy includes:
determining an upper bound limit as a function of Euclidean distance to at least one of the plurality of location anchors for each of the plurality of positions on the site rendering; and
for each of the plurality of positions on the site rendering, combining each of the upper bound limits to derive the estimated error value.

10. The method of claim 9, wherein the function of Euclidean distance is based on RSSI and wherein determining the upper bound limit and the estimated error value for each of the plurality of positions on the site map is based on determining a mean value RSSI, an expected standard deviation of RSSI, and an upper bound on the RSSI as a function of the Euclidian distance.

11. The method of claim 10, wherein determining the upper bound limit includes using the Euclidean distance to determine an expected average RSSI and using the expected average RSSI to determine the upper bound limit, wherein the upper bound limit depends on a user input specifying a desired level of confidence in location accuracy.

12. The method of claim 9, wherein the function of Euclidean distance is based on time of flight and wherein determining the upper bound limit and the estimated error value for each of the plurality of positions on the site rendering is based on determining a mean value of time of flight, an expected standard deviation of time of flight, and an upper bound of time of flight as a function of the Euclidean distance.

13. The method of claim 10, wherein the mean value of RSSI and the expected standard deviation of RSSI are based on measurements obtained in an RF site survey at a plurality of positions at the site.

14. The method of claim 10, wherein the mean value of RSSI and the expected standard deviation of RSSI are based on an RF propagation model that takes into account a presence of equipment and buildings at the site.

15. The method of claim 10, further comprising receiving user input specifying a desired level of confidence in location accuracy, and using the user input to determine the upper bound on the RSSI.

16. The method of claim 15, wherein a value of a number of RSSI standard deviations is used to determine the upper bound on the RSSI.

17. The method of claim 1, further comprising:
determining a second position of at least one location anchor of the plurality of location anchors on the site rendering based on user input;
determining, for the plurality of positions on the site rendering, a second estimated error value of location accuracy as a function of position on the site rendering;
generating a second contour map of the second estimated error value of location accuracy for the plurality of positions on the site rendering; and
displaying the second contour map.

18. The method of claim 17, further comprising:
identifying a position of a second location anchor on the site rendering;
determining, for the plurality of positions on the site rendering, a second estimated error value of location accuracy as a function of position on the site rendering;
generating a second contour map of the second estimated error value of location accuracy for the plurality of positions on the site rendering;
displaying the second contour map;
generating an inventory of contour maps; and
determining a cost before moving the at least one location anchor, a cost after moving the at least one location anchor, a cost before adding the second location anchor, and a cost after adding the second location anchor.

19. The method of claim 1, further comprising generating a bill of materials the at least one location anchor at the site.

20. The method of claim 1, wherein each of the estimated error values includes one of a worst case error value or an average error value.

21. A system comprising:
executable control software stored on a non-transitory computer readable medium; and at least one programmable processor for:
identifying a position of a plurality of location anchors on a site rendering;
determining via a wireless signal measurement, for each of a plurality of positions on the site rendering, a respective upper bound and a lower bound of an estimated error value of location accuracy as a function of Euclidean distance from each of the plurality of location anchors;
forming a bounding box of dimensions X and Y around each of the plurality of positions based upon intersections of the respective upper and lower bounds of at least two of the plurality of location anchors, wherein forming the bounding box comprises
creating an array of pseudo-test points, wherein the pseudo-test points are a set of points that are equidistant from two of the plurality of location anchors and are positioned to cover the site rendering entirely, thereby enabling a preparation of values of location errors for positions across a site;
calculating a received signal strength indication (RSSI) as a function of Euclidean distance from the plurality of location anchors, for each of the pseudo-test points;
calculating an expected standard deviation of RSSI; and
calculating X and Y such that the respective upper and lower bounds are based upon the standard deviation of RSSI for the pseudo-test points; and
generating an overlay rendering of the estimated error values of location accuracy for the plurality of positions on the site rendering where each estimated error value of the estimated error values is a relatively larger value of the X and Y dimensions of the bounding box of the associated position or a square root of an area of the bounding box.

22. The system of claim 21, further comprising a graphical user interface for displaying the overlay rendering.

23. The system of claim 21, further comprising user inputs for adding, moving, or deleting at least one of the plurality of location anchors.

24. A method comprising:
measuring a wireless signal;
determining an upper bound and a lower bound of accuracy of a location estimate based upon the wireless signal measurement with respect to at least two different location anchors as a function of Euclidean distance for each of a plurality of locations on a site rendering;
forming a bounding box with dimensions X and Y around each of the plurality of locations by identifying intersections between the respective upper and lower bounds of the at least two different location anchors, wherein forming the bounding box comprises:
creating an array of pseudo-test points, wherein the pseudo-test points are a set of points that are equidistant from two of the plurality of location anchors and are positioned to cover the site rendering entirely, thereby enabling a preparation of values of location errors for positions across a site;
calculating a received signal strength indication (RSSI) as a function of Euclidean distance from the at least two different location anchors, for each of the pseudo-test points;
calculating an expected standard deviation of RSSI; and
calculating X and Y such that the respective upper and lower bounds are based upon the standard deviation of RSSI for the pseudo-test points;
generating an overlay rendering visually displaying the determined accuracy of the location estimate for each of the plurality of locations on the site rendering wherein the determined accuracy for each of the plurality of locations is equal to a relatively larger value of the X and Y dimensions of the bounding box of the associated location or a square root of an area of the bounding box; and
communicating the overlay rendering to a user.

25. The method of claim 24, wherein determining the accuracy of the location estimate for each of the plurality of locations on the site rendering includes determining an RSSI for each of the plurality of locations on the site rendering as a function of distance front a plurality of location anchors.

* * * * *